(12) United States Patent
Bader (10) Patent No.: US 6,808,239 B1
(45) Date of Patent: Oct. 26, 2004

(54) CASING

(75) Inventor: Harald Bader, Peiting (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/959,109

(22) PCT Filed: Apr. 18, 2000

(86) PCT No.: PCT/DE00/01212

§ 371 (c)(1),
(2), (4) Date: Oct. 17, 2001

(87) PCT Pub. No.: WO00/64127

PCT Pub. Date: Oct. 26, 2000

(30) Foreign Application Priority Data

Apr. 21, 1999 (DE) .......................................... 199 18 054

(51) Int. Cl.⁷ .............................................. A47B 97/00
(52) U.S. Cl. ................................ 312/223.4; 312/265.5; 312/222; 292/19; 292/91
(58) Field of Search .............................. 312/223.1, 222, 312/223.4, 257.1, 264, 265.5; 292/10, 13, 17, 19, 20, 80, 81, 87, 91, DIG. 11; 361/679, 814; 379/433.07, 433.01

(56) References Cited

U.S. PATENT DOCUMENTS

| | | | |
|---|---|---|---|
| 2,997,321 A | * 8/1961 | Bobrick ........................ 292/91 |
| 4,535,870 A | * 8/1985 | Lindsay ........................ 292/19 |
| 4,583,774 A | * 4/1986 | Holden et al. ................. 292/19 |
| 4,629,227 A | * 12/1986 | Peterson ....................... 292/19 |
| 5,233,506 A | 8/1993 | Semenik et al. |
| 5,276,588 A | 1/1994 | Repplinger et al. |
| 5,371,791 A | * 12/1994 | Schwartz et al. ...... 379/433.01 |
| 5,778,063 A | * 7/1998 | Dunchock ................... 379/446 |
| 5,946,395 A | * 8/1999 | Petrella et al. ......... 379/433.01 |
| 5,955,700 A | * 9/1999 | Slipy et al. .................. 361/759 |
| 5,997,115 A | * 12/1999 | Radloff et al. ........... 312/223.2 |
| 6,111,760 A | * 8/2000 | Nixon ........................ 361/814 |
| 6,157,545 A | * 12/2000 | Janninck et al. ............. 361/814 |

FOREIGN PATENT DOCUMENTS

| | | | |
|---|---|---|---|
| DE | 39 33 644 | 4/1991 | |
| DE | 94 03 890 | 8/1995 | |
| DE | 298 12 051 | 3/1999 | |
| EP | 0 367 611 | 5/1990 | |
| EP | 0 769 893 | 4/1997 | |
| EP | 0 878 942 | 11/1998 | |
| JP | 403110279 A | * 5/1991 | ................. 292/91 |
| WO | WO 93/17513 | 9/1993 | |

* cited by examiner

*Primary Examiner*—Lanna Mai
*Assistant Examiner*—Hanh V. Tran
(74) *Attorney, Agent, or Firm*—Bell, Boyd & Lloyd LLC

(57) ABSTRACT

Casing, in particular plastic casing (1; 101; 201; 301) of a hand-held electronic apparatus, having a first and a second casing shell (3, 5; 103, 105; 203, 205; 303, 305) and connecting means pressing the first and second casing shells against each other along the contact region, the connecting means having at least one holding element (17), arranged on the first casing shell (5), for a separate locking element (7; 107a, 107b; 207; 307) and at least one hook element (13) arranged on the second casing shell (3).

13 Claims, 6 Drawing Sheets

CASING

The invention relates to a casing, in particular a plastic casing of a hand-held electronic apparatus, according to the preamble of claim 1.

With the explosive expansion of small electronic apparatuses ("hand-held devices"), plastic casings of this type have become a specific mass-produced product. In view of the fact that they house high-quality, expensive and relatively sensitive electronic components and functional groups, they have to satisfy high requirements demanded of the quality and nevertheless have to be produced and equipped simply and cost-effectively. As a rule, it is also necessary to be able to open and securely reclose casings of this type for maintenance and repair purposes. Particular requirements are imposed on the dust seal, the electromagnetic shielding effect and the shock resistance of these casings.

Many of the casings under discussion, also including the plastic casings for mobile telephones, comprise essentially two casino shells made of impact-resistant plastic (for example, ABS plastic), which are connected to each other essentially nonreleasably by means of latching elements or a snap connection or releasably by screw connections. There are also casings in which snap connections and latching connections are combined.

The design, in a manner appropriate for the material involved, of a screw-down dome in a casing of this type always constitutes a compromise between the requirements of plastics technology, on the one hand, and the resultant space required in the apparatus. Since screw-down domes of this type are always formed with a certain clearance with respect to the casing outer wall, due to requirements to do with plastics technology, their presence as a whole results in "surface consumption", which always exceeds their actual cross-sectional area. With increasing miniaturization of a very wide variety of hand-held devices, for example mobile telephones, organizers, pocket translators, hand-held PCs cordless telephones, this problem is becoming ever more relevant.

The invention is therefore based on the object of specifying a casing of the generic type which can be opened and reclosed without particular complexity, and in which the ratio of interior space which can be used to the overall volume is very good.

The invention includes the essential concept of providing, on the casing parts to be connected, holding and hook elements and a separate locking element which to a certain extent wedges the holding elements to the inner wall of the respective outer casing part. By means of a hook-like design of at least some of the holding elements, it is ensured that a closing force which can be applied easily is opposed by a very high opening force if the locking element is in undisturbed engagement with the holding elements. If, in contrast, said locking element is removed from the casing or is deformed in a suitable manner, it loses its locking or wedging effect, and the housing can again be opened easily.

In a preferred design, the locking element is fitted into a guide in a first casing shell or into holding elements provided behind said casing shell and is engaged around by holding elements, which act in a hook-like manner, on a second casing shell, or, if the locking element is appropriately shaped, said holding elements engage therein. As a result of this engagement around or in said locking element, the hook elements of the second casing shell are pressed against corresponding contact surfaces of the first casing shell. If said contact surfaces are designed with suitable frictional surfaces or else undercuts or the like, a force- and/or form-fitting connection is produced as a result, which connection has a high holding force so long as the locking element is in situ and is in its form which produces the locking effect.

The effect under discussion is produced in an expedient manner in the region of the casing side surface, i.e. the longitudinal edge sections of the casing shells, in which case, with regard to compensation of any manufacturing tolerances and a desirable, certain elasticity of the connecting means, the provision of a plurality of hook elements spaced apart from one another along the edge is expedient.

In one design, in which holding elements and hook elements are provided on both casing shells for engagement with the locking element, an alternating sequence of elements formed on the first and second casing shells in the edge longitudinal profile is expedient, in order to achieve a uniform contact-pressure effect over this profile.

In a particularly simple design, a flat metal plate can be used as the locking element, which plate has at least one edge which is matched to the edge profile of the casing shells, and is engaged around by the holding elements and hook elements of the casing shells. Also advantageous is a design in which this metal plate extends essentially over the entire width of the casing, with the result that two opposite edges serve for locking together the holding elements of the first and second casing shells, which holding elements are adjacent to said edges and lie opposite one another.

If the metal plate is flexurally elastic, compression or tension directed essentially vertically onto its surface can result in a flexural deformation, as a result of which the locking effect is cancelled and the casing shells can be separated from each other again.

An action of this type on the metal plate is possible by means of at least one suitably positioned actuating opening in one of the casing shells. Said opening may also be closed with a closure element which, in order to open the casing, is either removed or is designed displaceably or flexibly to such an extent that it itself can be pressed to a certain extent onto the metal plate as an extended compression pin.

In an alternative design, provision may also be made for the casing to be formed in such a manner that the metal plate is displaced within the casing from a first position, in which there is engagement with the holding elements and hook elements, into a second position in which this engaged state is cancelled. This can be achieved in a simple manner by its edge(s) having, for example, a meandering or serrated profile rather than a rectilinear profile.

In another design, the locking element is of wire- or pin-shaped design and is fitted into a corresponding guide on the one casing part in such a manner that when the other casing part is fitted, its holding elements slide perpendicularly with respect to the longitudinal profile of the wire or pin, past said profile and become hooked with projecting sections behind it, in which case they are simultaneously pressed against the inner wall of the casing part bearing the wire- or pin-shaped locking element.

Also in this design—with an appropriately flexurally elastic design of the locking element—release of the locking and therefore of the connection of the casing parts is possible by a flexural deformation. Furthermore, in this case too the locking element can be shaped in such a manner and mounted displaceably such that the transition from an engaged position into a disengaged position with regard to the holding elements or hook elements is implemented by a displacement of the locking element. Both the deformation and the displacement can be carried out in a casing part via actuating sections which are provided for this purpose.

However, a wire- or pin-shaped locking element can also be designed relatively easily such that it can be pulled out of the closed casing, whereupon the holding elements relax and the connection between the casing parts is canceled.

In a special design, the wire-shaped locking element is in the form of a clasp or clip which extends over mutually opposite sections of two casing longitudinal edges and the casing end side connecting said longitudinal edges and therefore—in a similar manner as the abovementioned metal plate—causes locking in a plurality of edge regions simultaneously. Also, with an appropriate design of the casing, a clip or clasp of this type can be pulled out of said casing in order to release the connection of the casing parts.

Advantages and expedient uses of the invention are otherwise revealed in the subclaims and in the following description of preferred embodiments with reference to the figures, in which:

FIGS. 1 to 5 illustrate a mobile telephone casing 1 (without battery-compartment cover) in various views and installation states, which casing comprises an upper casing shell 3 and a lower casing shell 5. As the locking element for the installation of the casing, use is made here of an essentially rectangular spring steel plate 7 which, at the same time, upwardly closes the battery compartment 9.

The upper and lower casing shells 3, 5 are formed in such a manner that they have a respective, encircling edge 3a or 5a lying essentially in a horizontal plane, which edges touch each other in the fitted state (FIGS. 1 and 5) and form a contact region 3a /5a. In the region of the upper end side 1a of the casing 1, as can best be seen in FIGS. 2 and 3, two tabs 11 are integrally formed on the upper casing shell 3 opposite which small hooks (not denoted separately) are situated, which small hooks are integrally formed in a corresponding position on the lower casing shell 5, engage, during the installation of the casing in the manner shown in FIG. 3, in the tabs 11 and initially produce a type of hinged connection in the region of the upper end side 1a. In the region of the two side surfaces 1b, 1c of the casing 1, three hook elements 13 are in each case integrally formed on the upper casing shell 3 with clearance regions 15 situated in between, which hook elements—in the same manner as the tabs 11—protrude over the edge 3a of the upper casing shell 3 in the direction of the lower casing shell 5. The shape of the hook elements 13 can best be seen in FIG. 3 and is distinguished by an enlarged area to the outside and by the presence of a hook-like projection 13a directed toward the inside of the casing shell 3.

Figure 1:
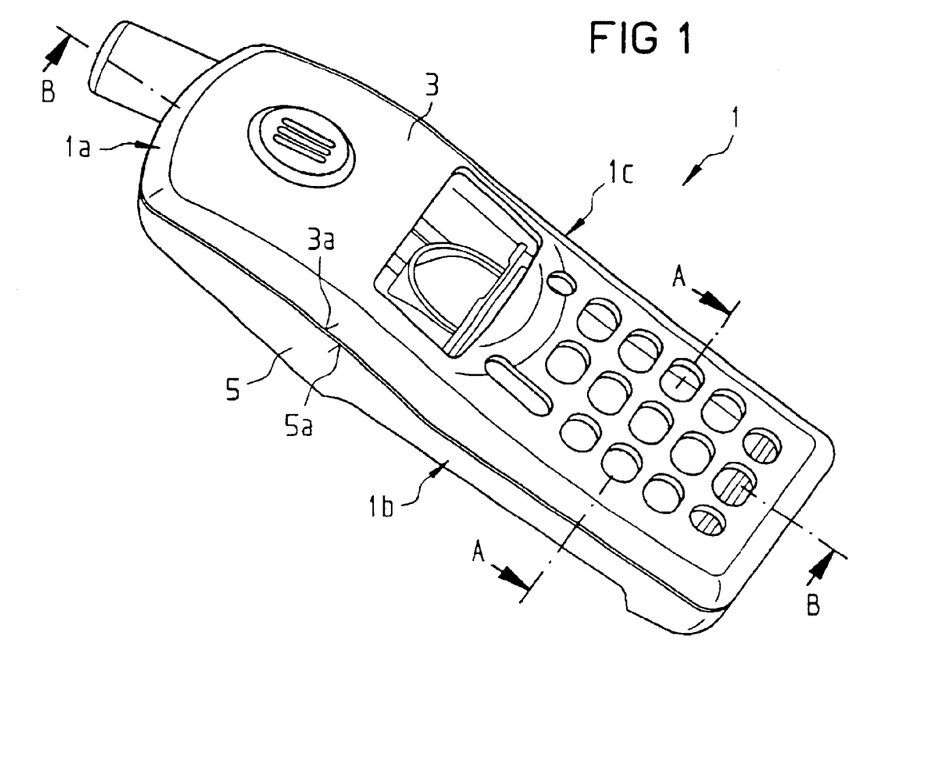
FIG. 1 shows a perspective illustration of a mobile telephone casing according to a first embodiment of the invention.
Figure 2:
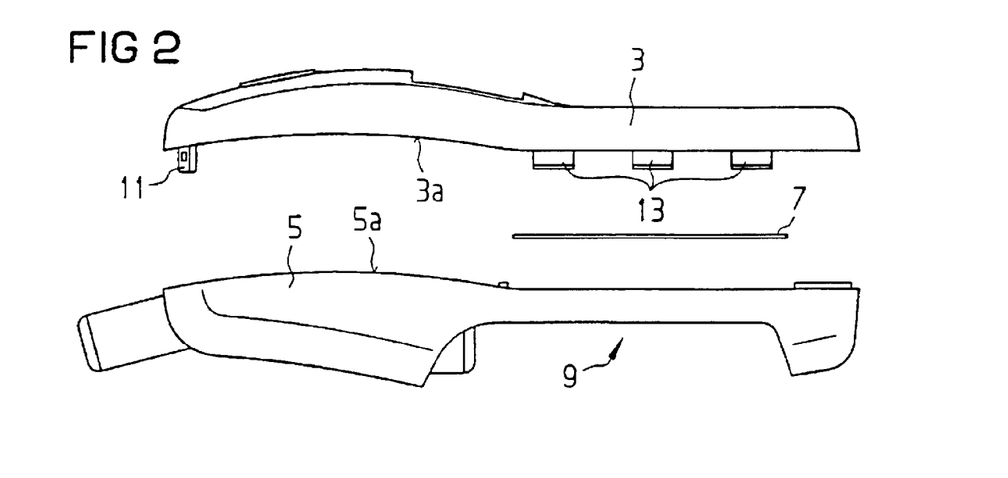
FIG. 2 shows a lateral exploded illustration of the casing according to FIG. 1.
Figure 3:
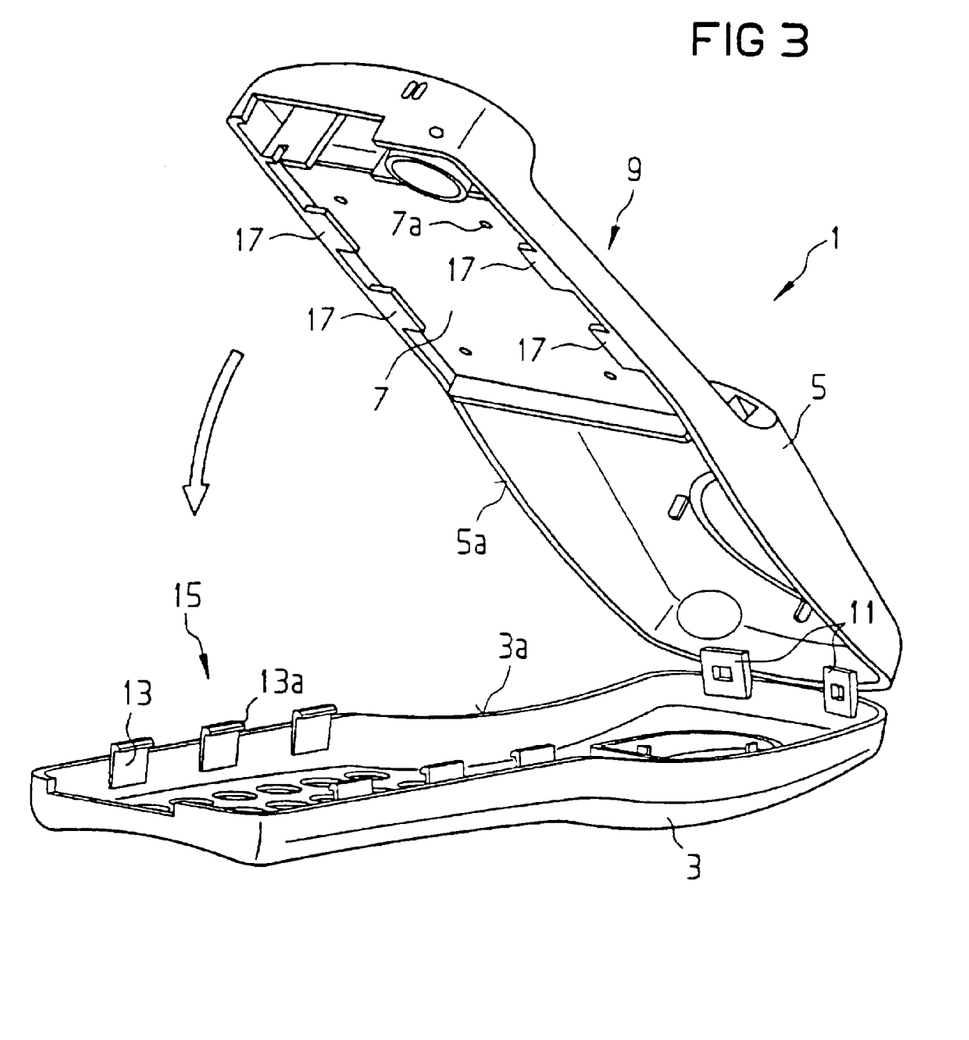
FIG. 3 shows an oblique view of the casing shells of the casing according to FIG. 1, which shells are already connected to each other in an end side region, together with a view into the interior of said casing.
Figure 4:
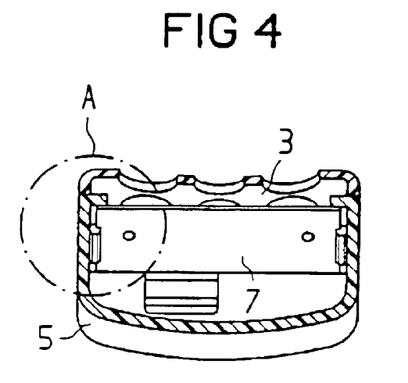
FIG. 4 is a cross sectional view taken along line IVA—IVA of FIG. 1.
Figure 4A:
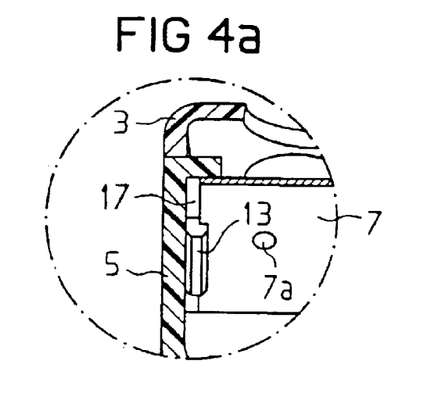
FIG. 4a is an enlarged cross sectional of areas IVA of FIG. 4.
Figure 5:
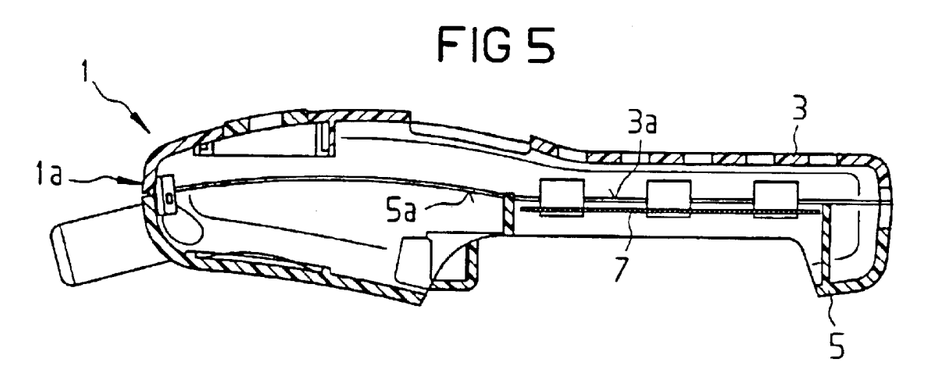
FIG. 5 shows a longitudinal sectional illustration of the casing according to FIG. 1 along the section line B—B.

Two respective projections 17 which are directed horizontally toward the inside of the casing shell are integrally formed on the edge 5a of the lower casing shell 5, likewise in the region of the battery compartment 9, in a position in the two side surface regions 1b, 1c of the casing 1, which position corresponds to the clearance regions 15 between the hook elements 13 of the upper casing shell 3, as can best be seen in FIG. 3. The spring steel plate 7 is fixed in the lower casing shell 3 behind these projections 17.

The width of the spring steel plate 7 is selected in such a manner that a further clearance region toward the inner wall of the casing shell 5 remains on the side edges, which clearance region permits the hook elements 13 to slide past the side edges of the spring steel plate 7 when the casing shells 3, 5 are swung together in accordance with FIG. 3. After the hook-like extensions 13a have passed the side edges of the spring steel plate 7 under prestress caused by the elasticity of the material, they partially relax in the direction of the interior of the casing shell 5 and, as a result, become hooked behind the spring steel plate. At the same time, however, as a consequence of the corresponding dimensioning of the clearance between the side edges of the spring steel plate and the inner wall of the lower casing shell 5 and of the cross-section of the hook element 13, said extensions remain pressed against the inner wall of the casing shell 5 by means of a wedge effect exerted by the spring steel plate 7. As a consequence of this combined wedge and hook effect, the casing shells 3, 5 are connected to each other via the spring steel plate 7 in a force- and form-fitting manner.

Exertion of a pressure on the surface of the spring steel plate causes the latter to be deformed in a flexurally elastic manner, as a result of which its side edges are displaced somewhat inward and the hook elements 13 are released in a relaxed position, after which the casing shells 3, 5 are swung open again, by pulling counter to the arrow in FIG. 3, and after the tabs 11 have been unhooked from the small hooks interacting with them, can be completely released from each other again. However, depending on the fitting of a casing, a compressive deformation of the spring steel plate is not, as a rule, permissible in practice. In the design of the spring steel plate 7 shown in FIGS. 3 to 4a, the latter therefore has four holes 7a in which a special pair of pliers can engage from the battery compartment 9 and can exert a tensile force on the metal plate, as a result of which a flexural deformation and a "migration" of the side edges inward is brought about in a similar manner, with the consequence of the hook elements 13 being released.

Figure 6:
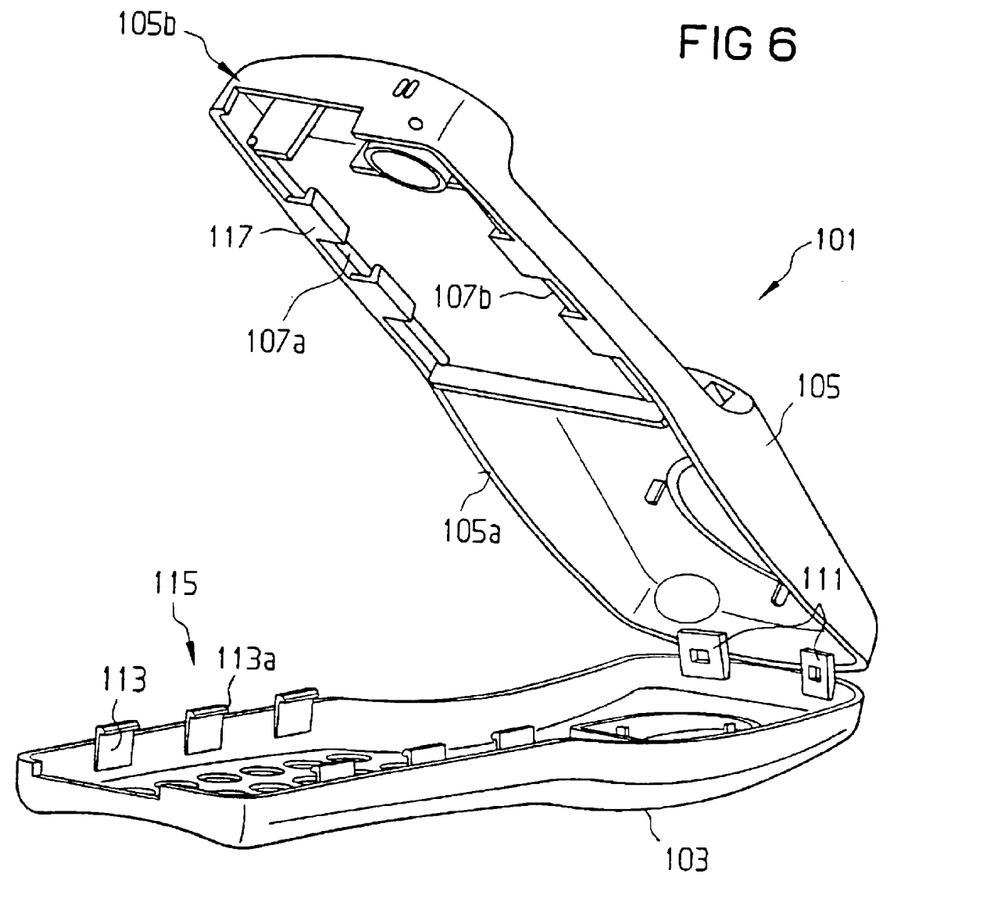
FIGS. 6 to 8 show oblique views of a second to fourth embodiment of a mobile telephone casing in each case with a view into the interior of the casing shells.

FIG. 6 shows a second embodiment of a mobile telephone casing 101, in which case here—as in the explanation of the following embodiments—the basic structure of the casing corresponds to that of the first embodiment and parts which correspond with one another are denoted by reference numbers which follow the illustration of FIGS. 1 to 5. In this respect, the above explanation will not be repeated below either.

In the design according to FIG. 6, the structure of the upper casing shell 3 is identical with the structure in the first embodiment. The modification resides in replacing the spring steel plate 7 in the first embodiment by two steel pins 107a, 107b which are inserted, parallel to the profile of the casing shell edge 105a, through corresponding openings (not denoted separately) in the region of the lower end side 105b of the lower casing shell 105. The pins 107a, 107b are engaged around by in each case two fixing hooks 117 which fix them both in the vertical direction and—with a predetermined amount of play—laterally.

The function of the pins 107a, 107b, which are used here as locking elements, is very similar to that of the spring steel plate in the first embodiment: the presence of a predetermined clearance region with respect to the inner wall of the casing shell 105, in conjunction with the elasticity of the material of the pins 107a, 107b and of the fixing hooks 117, makes it possible, when the casing shells 103, 105 are swung together, for the hook elements 113 to slide past the pins 107a, 107b and to become hooked behind the latter by means of the hook-like projections 113a. Here too, there is a combined effect of the hooking action with a simultaneous pressing of the outsides of the hook elements 13 against the inner wall of the casing shell 105, with the result that the connection can be termed a combined force- and form-fitting connection.

This connection is released by grasping the heads (not denoted separately) of the steel pins 107a, 107b from the end side 105b of the casing shell 105 and pulling them out in the longitudinal direction of the casing shell. After the locking elements have been removed, the hook elements 113 lose their function, and the casing shells 103, 105 can readily be swung apart again.

Figure 7:
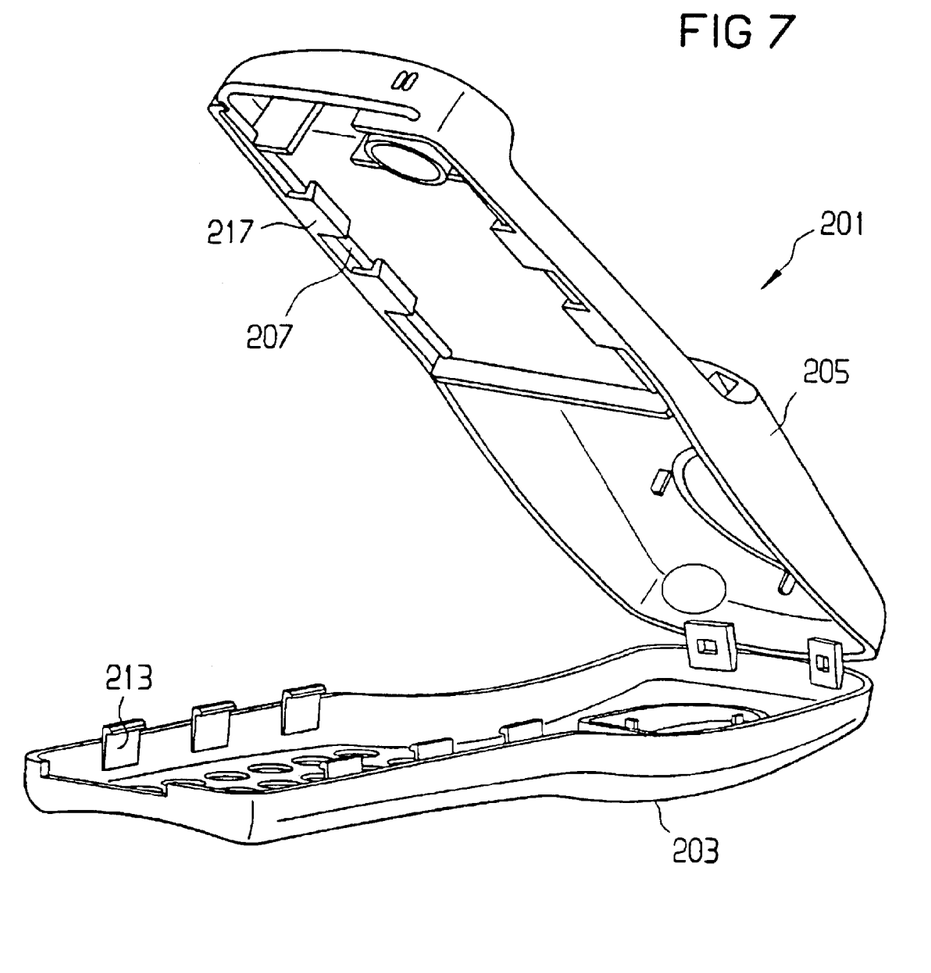

FIG. 7 shows, as a third embodiment in diagrammatic form, a mobile telephone casing 201 into which—with the structure otherwise essentially corresponding with the first and second embodiments—a U-shaped spring steel clasp 207 is inserted from the lower end side 205b of the upper casing shell 205, as the locking element. This clasp replaces the steel pins 107a, 107b in the second embodiment (FIG. 6), but has virtually the same effect as the latter, with the result that reference can be made to the above description of the functioning. Here too, the connection is released by removal of the locking element, i.e. by pulling out the spring steel clasp 7 in the longitudinal direction of the casing.

Figure 8:
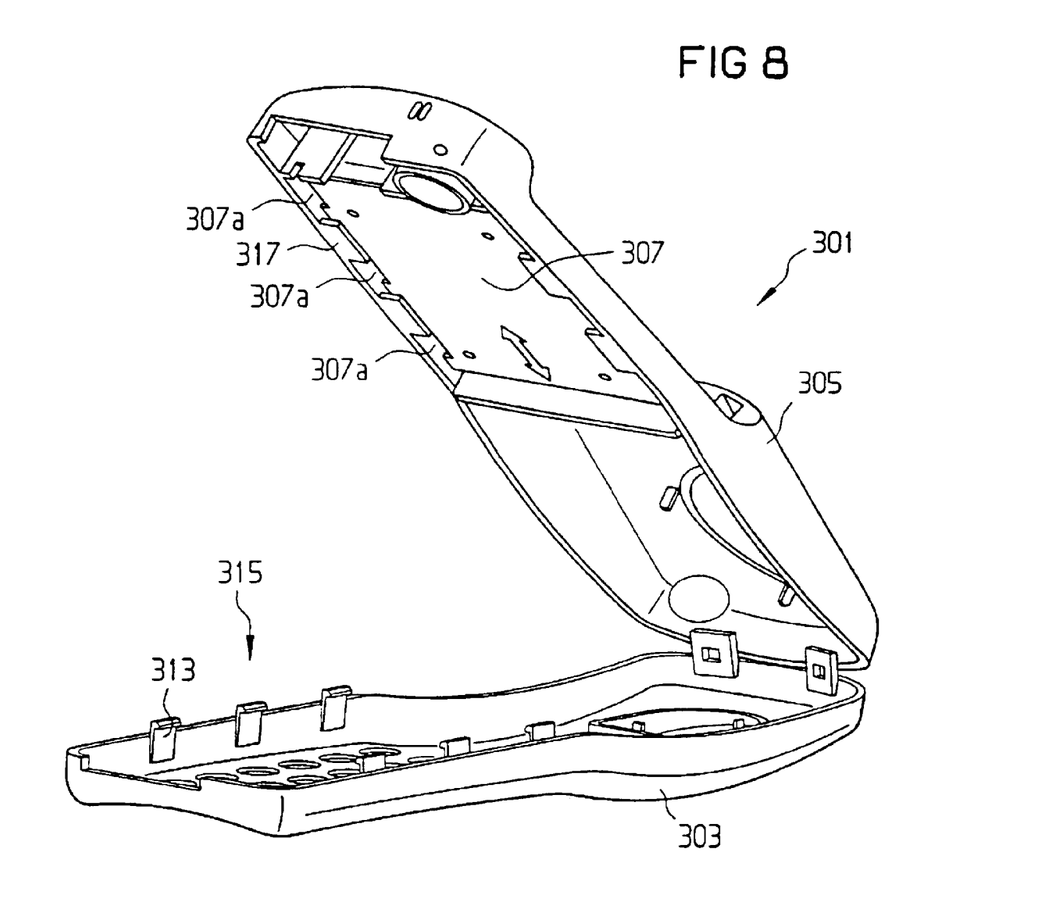

FIG. 8 shows, as a fourth embodiment, a mobile telephone casing 301, in which the principle of the spring steel plate as the locking element, which principle is known from the first embodiment, is realized in a modified form. The design of the lower casing shell 305 corresponds here essentially to the first embodiment, but the shape of the plate 307 and the width of the hook elements 313 and (correspondingly) the width of the clearance regions 315 differs from the latter:

The lateral boundary edges of the spring steel plate 107 are not rectilinear, but have rectangular recesses 307a, and the length of the plate is somewhat smaller than the length of the available insertion space in the lower casing shell 305, with the result that the plate can be displaced by the corresponding amount of difference in the longitudinal direction in said space. Since, in addition, the hook elements 313 are only approximately half as wide as in the first embodiment, displacement of the plate 307 enables optionally either a recess region 307a or a region of the maximum lateral extent of the plate to be brought into alignment with the hook elements 313. In order to close the casing, the plate 307 is brought into the last-mentioned position, in which its function corresponds to that described above in conjunction with the first embodiment, i.e., when the casing shells 303, 305 are swung together, the hook elements 313 engage around the side edge of the plate 307 and become hooked there and are wedged against the inner wall of the lower casing shell 305.

In order to open the casing 301, the plate 307 is displaced in the longitudinal direction of the casing by the possible amount of displacement which corresponds to the width of the hook elements 313, with the result that in each case recess regions 307a are aligned with the hook elements 313. In this state, the plate 307 releases the hook elements 313 into the relaxed state, and the casing shells 303, 305 can be released from each other.

The design of the invention is not restricted to the above embodiments, but is also possible in a multiplicity of modified forms depending on the structural conditions of specific casings.

Modification are also possible with regard to the installation procedure. Thus, the locking element in all the above-described designs can also be pushed in after the casing shells have been joined together.

What is claimed is:

1. A casing for a hand-held electronic apparatus comprising:
a first casing shell and a second casing shell, each of said casing shells having elongated contact regions with each other and connecting means for pressing the first and second casing shells against each other alone the contact regions, the connecting means including at least one holdings element arranged in the first casing shell for a separate locking element and at least one hook element being arranged on the second casing shell, said at least one hook element of the second casing shell engaging a portion of the locking element so that the locking element and at least one hook element connect the first and second casing shells to each other;
wherein an inner wall of the first casing shell in a position corresponding to the at least one hook element has a frictional surface onto which the at least one hook element is pressed in the engaged state with the locking element so that an interaction of the hook element with the frictional surface causes the first and second housing shells to be connected in a force-fitting manner; a plurality of holding elements and a plurality of hook elements are provided in alternate arrangement along the contact regions of the first and second casing shells; and the locking element is a flat metal plate having a longitudinal edge profile which is matched essentially to the profile of the inner wall of the first casing shell and defines a predetermined clearance region with respect to said profile.

2. A casing according to claim 1, wherein the flat metal plate extends approximately over the entire width of the first casing shell and acts as a common locking element for hook elements provided on opposite side edges of the second casing shell.

3. A casing according to claim 1, wherein the flat metal plate is elastically deformable and the casing has at least one open section via which a force can be exerted on a surface of the flat metal plate to cause the flat metal plate to be elastically deformed to relate the hook elements, so that the connection between the first and second casing shells.

4. A casing according to claim 1, wherein the flat metal plate has recess regions on side edges and is displaceable in the first casing shell so that a recess region can be brought into alignment with each hook element enabling the connection between the first and second casing shells to be released.

5. A casing according to claim 1, wherein the locking element is a pin-shape locking element provided in the at least one holding element of the first casing shell.

6. A casing according to claim 5, wherein the pin-shaped locking element is accessible from the outside of the casing and can be pulled out of the at least one holding element to disengage the first and second casing shells from each other.

7. A casing according to claim 1, wherein the locking element is a wire in the form of a U-shaped clasp with a portion extending outside an end of the first casing shell and portions extending along part of two opposite side surfaces of the first casing shell.

8. A casing according to claim 1, wherein the locking element is a flat metal plate having a longitudinal edge which is matched essentially to the profile of the inner wall of the first casing shell and defines a predetermined clearance region with respect to said profile.

9. A casing according to claim 8, wherein the flat metal plate extends approximately over the entire width of the first casing shell and acts as a common locking element for hook elements provided on opposite side edges of the second casing shell.

10. A casing according to claim 8, wherein the flat metal plate is elastically deformable and has substantially straight-line edges, said casing having at least one open section via which a force can be exerted on a surface of the flat metal plate to cause the flat metal plate to be elastically deformed to withdraw the edges from engagement with the hook elements to release the connection between the first and second casing shells.

11. A casing according to claim 8, wherein the flat metal plate has recess regions in a region of each of the side edges, said flat metal plate being displaceable in the first casing shell so that the recessed regions can be brought into alignment with the hook elements to enable the connection between the first and second casing shells to be released.

12. A casing according to claim 1, wherein the locking elements comprises a pin-shaped locking element being provided along each side of the first casing shell and being engaged by the holding elements, said pin-shaped locking element being accessible from tile outside of the casing and being pulled out of the holding elements to release the connection between the first and second casing shells.

13. A casing according to claim 1, wherein the locking element is a U-shaped clasp having wire-shaped legs extending along each side of the first casing shell, said U-shaped clasp having a portion extending out of an end of the casing and being withdrawn to release the connection between the first and second casing shells.

* * * * *